US011226765B2

(12) United States Patent
Shaver (10) Patent No.: US 11,226,765 B2
(45) Date of Patent: Jan. 18, 2022

(54) SERIAL AT ATTACHMENT AND NON-VOLATILE MEMORY EXPRESS DEVICE DETERMINATION

(71) Applicant: HEWLETT-PACKARD DEVELOPMENT COMPANY, L.P., Spring, TX (US)

(72) Inventor: Charles Shaver, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/766,084

(22) PCT Filed: Nov. 22, 2017

(86) PCT No.: PCT/US2017/062977
§ 371 (c)(1),
(2) Date: May 21, 2020

(87) PCT Pub. No.: WO2019/103736
PCT Pub. Date: May 31, 2019

(65) Prior Publication Data
US 2020/0356303 A1   Nov. 12, 2020

(51) Int. Cl.
G06F 3/06       (2006.01)
G06F 13/38      (2006.01)
G06F 13/40      (2006.01)

(52) U.S. Cl.
CPC .......... *G06F 3/0655* (2013.01); *G06F 3/0604* (2013.01); *G06F 3/0679* (2013.01); *G06F 13/385* (2013.01); *G06F 13/4068* (2013.01)

(58) Field of Classification Search
None
See application file for complete search history.

(56) References Cited

U.S. PATENT DOCUMENTS 9,818,456 B1    11/2017  Hua-Kang
10,740,466 B1 *  8/2020  Bshara ................... G06F 21/71
(Continued)

FOREIGN PATENT DOCUMENTS

CN      206557760 U       10/2017
WO      WO-2016122461 A1   8/2016
WO      WO-2016122476 A1   8/2016

OTHER PUBLICATIONS

Cunningham, A., Understanding M.2, the interface That Will Speed Up Your Next SSD, Sep. 2, 2015, https://arstechnica.com/gadgets/2015/02/understanding-m-2-the-interface-that-will-speed-up-your-next-ssd/.

*Primary Examiner* — Farley Abad
*Assistant Examiner* — Dayton Lewis-Taylor
(74) *Attorney, Agent, or Firm* — Brooks Cameron & Huebsch PLLC (57) ABSTRACT

Example implementations relate to SATA and NVMe device determination. An example method can include determining a device type communicatively coupled to an M.2 socket of a central processing unit (CPU) based on a PEDET signal from the M.2 socket. The method can include configuring a crossbar switch to route a plurality of serial AT attachment (SATA) signals to the M.2 socket in response to a determination that the device is a SATA device type. The method can include configuring the crossbar switch and a multiplexer to route a plurality of non-volatile memory express (NVMe) signals to the M.2 socket in response to a determination that the device is an NVMe device type.

15 Claims, 5 Drawing Sheets

(56) References Cited

U.S. PATENT DOCUMENTS

| | | | |
|---|---|---|---|
| 2011/0320706 A1* | 12/2011 | Nakajima | G06F 11/0727 |
| | | | 711/114 |
| 2016/0259597 A1 | 9/2016 | Worley et al. | |
| 2016/0259754 A1 | 9/2016 | Ping | |
| 2017/0083470 A1 | 3/2017 | Hia | |
| 2017/0228179 A1 | 8/2017 | Levinson et al. | |
| 2017/0264060 A1* | 9/2017 | Kimura | H01R 27/00 |
| 2018/0285307 A1* | 10/2018 | Willis | G06F 9/544 |

\* cited by examiner

=== PAGE 1 ===

SERIAL AT ATTACHMENT AND NON-VOLATILE MEMORY EXPRESS DEVICE DETERMINATION

BACKGROUND

Serial AT attachment (SATA) is a computer bus interface that connects host bus adapters to mass storage devices such as hard disk drives, optical drives, and solid-state drives. Non-volatile memory express (NVMe) is an open logical device interface specification for accessing non-volatile storage media attached via a PCI Express (PCIe) bus. SATA and NVMe are storage protocols that work with solid state drive memory (SSD).

DETAILED DESCRIPTION

NVMe can be a higher performance option for a storage protocol as compared to SATA. However, some devices, such as thin clients, may not use NVMe. When implementing SATA, differential transmit and receive lanes can be used, while NVMe can use two (e.g., ×2 NVMe device) or four (e.g., ×4 NVMe device) PCIe lanes. Some central processing units (CPUs) may share NVMe pins and SATA pins, which can result in difficulty in the use of both SATA and NVMe. For instance, a user may desire to use a display port, but that port cannot be used because a universal serial bus (USB) port is being used that shares pins with the display port.

In some approaches to using both SATA and NVMe, SATA and NVMe can be broken out using multiplexers ("muxes"), which can allow for NVMe and SATA to exist on a same M.2 socket, but they exist as one NVMe socket and two separate SATA sockets. Examples of the present disclosure can allow for two M.2 sockets that are SATA or ×2 NVMe, or the present disclosure can allow for two M.2 SATA sockets, one of which can be a ×4 NVMe socket. For instance, the first example of the present disclosure can include two SATA sockets that can accommodate ×2 NVMe device types allowing two SATA devices or two ×2 NVMe devices. The second example of the present disclosure can allow for two SATA sockets that allow for two SATA device types or one ×4 NVMe device type. For instance, some examples can include a basic input/output system (BIOS) using a PE detect (PEDET) signal from an M.2 socket to determine whether a SATA type device or an NVMe type device is in the socket. That information can be used to configure a crossbar switch or a crossbar switch and a mux to route four PCIe lanes to the two M.2 sockets. Such examples can be used with thin client devices, as will be discussed herein, including those devices having a plurality of display port outputs, more than two displays, increased power CPUs, dual channel memory-to-feed displays, fans, etc., among other characteristics.

A PEDET signal can include a signal that can be used to determine what is connected to an M.2 socket. For instance, in the case of storage, a PEDET signal at a low level means SATA is to be used, while if a PEDET signal at a high level means the M.2 socket is empty or has a device connected to it that uses PCIe. In some examples, a PEDET signal can have a pullup resistor on it to a motherboard.

Put another way, some examples of the present disclosure can include a communicatively coupled device such as a CPU connected to an M.2 socket. The communicatively coupled device can share functions on its pins. For instance, a CPU can share SATA and PCIe lanes (e.g., for an NVMe device) on the same set of pins. In such an example, it can be determined whether to send PCIe signals (also referred to herein as NVMe signals) or SATA signals to the M.2 socket. Information about whether the M.2 socket receives SATA or PCIe signals can determine how to point a mux to rout the right signals to the right place.

Figure 1:
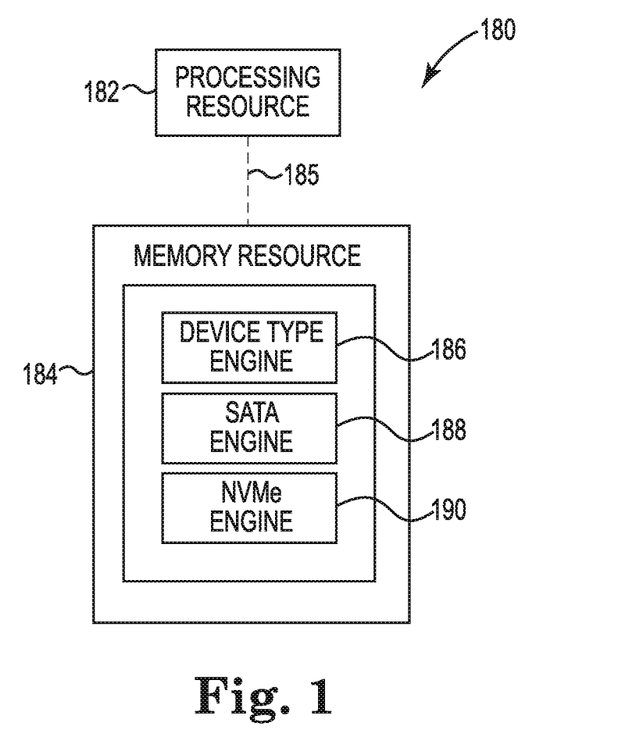
FIG. 1 illustrates a diagram of a controller including a processing resource, a memory resource, and engines according to an example.

FIG. 1 illustrates a diagram of a controller 180 including a processing resource 182, a memory resource 184, and engines 186, 188, 190 according to an example. For example, the controller 180 can be a combination of hardware and instructions for SATA and NVMe device determination. The hardware, for example can include a processing resource 182 and/or a memory resource 184 (e.g., machine-readable medium (MRM), computer-readable medium (CRM), data store, etc.).

The processing resource 182, as used herein, can include a number of processors capable of executing instructions stored by a memory resource 184. The instructions (e.g., machine-readable instructions (MRI)) can include instructions stored on the memory resource 184 and executable by the processing resource 182 to implement a desired function (e.g., SATA and NVMe device determination). The memory resource 184, as used herein, can include a number of memory components capable of storing non-transitory instructions that can be executed by processing resource 182. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the controller 180 can be implemented on an electronic device and/or a collection of electronic devices, among other possibilities.

The memory resource 184 can be in communication with the processing resource 182 via a communication link (e.g., path) 185. The communication link 185 can be local or remote to an electronic device associated with the processing resource 182. The memory resource 184 includes engines (e.g., device type engine 186, SATA engine 188, NVMe engine 190). The memory resource 184 can include more engines than illustrated to perform the various functions described herein.

The engines 186, 188, 190 can include a combination of hardware and instructions to perform a number of functions described herein (e.g., SATA and NVMe device determination. The instructions (e.g., software, firmware, etc.) can be downloaded and stored in a memory resource (e.g., MRM) as well as a hard-wired program (e.g., logic), among other possibilities.

The device type engine 186 can determine based on a PEDET signal and using a BIOS, a device type communicatively coupled to a CPU via a first M.2 socket. In some examples, the first M.2 socket can have four general purpose pins. For instance, if the PEDET signal is above a particular threshold, a determination can be made that the device is an NVMe device type, and if the PEDET signal is below a particular threshold, a determination can be made that the device is a SATA device type.

In response to a determination that the device is a SATA device type, SATA engine 188 can configure a crossbar switch to route a first SATA signal set the first M.2 socket and a second SATA signal set to a second M.2 socket of the CPU. For instance, based on the PEDET signal, if a SATA device type is detected, the CPU can be set to send SATA signals to the M.2 socket. The CPU can be configured, in some examples, to have SATA on the CPU general purpose pins (e.g., sharing SATA lanes or PCIe lanes), as well as muxes set up to point the SATA signals to the right place. In some examples, the first SATA signal set can include a transmit differential pair signal and a receive differential pair signal. For instance, the signals can be complementary during transmission and receipt.

In response to a determination that the device is an NVMe device type, NVMe engine 190 can configure the crossbar switch and a mux to route a plurality of NVMe signals to the first M.2 socket and a third signal set to the second M.2 socket. The plurality of NVMe signals can be routed via PCIe lanes, and in some examples, the third signal set can include a plurality of NVMe signals. For instance, in response to a determination that the device is a ×4 NVMe device, the crossbar switch and the mux can be configured to route the plurality of NVMe signals to the first M.2 socket and a third SATA signal set to the second M.2 socket. Alternatively, in an example using a ×4 NVMe device with the muxes pointing to the first (e.g., primary) M.2 socket to form a ×4 NVMe, there may not be signals on the second (e.g., secondary) M.2 socket. In such an example, there may not be a SATA device communicatively coupled to the secondary M.2 socket with a ×4 NVMe device on the first M.2 socket.

In some examples, a determination may not be made whether there are two ×2 NVMe device type M.2 sockets or one ×4 NVMe device type M.2 socket. For instance, that may be predetermined during design to have a system with either two ×2 M.2 sockets or one ×4 M.2 socket. For instance, a system may be designed to have two M.2 sockets with each socket able to run a ×2 NVMe device or two M.2 sockets with one socket able to run a ×4 NVMe device. The CPU can share one ×2 NVMe set of pins with SATA pins.

Figure 2:
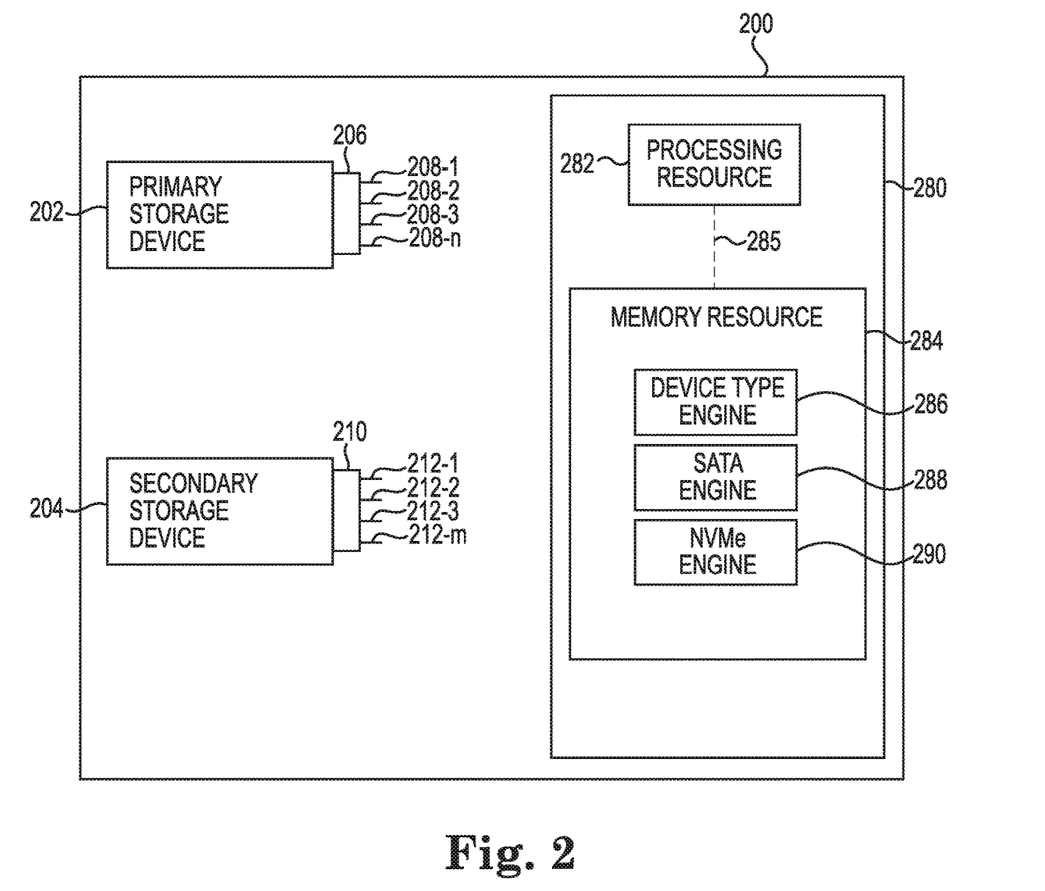
FIG. 2 illustrates a diagram of a device including a primary storage device, secondary storage device, and a controller according to an example.

FIG. 2 illustrates a diagram of a device 200 including a primary storage device 202, secondary storage device 204, and a controller 280 according to an example. In some examples, device 200 can be a thin client. A thin client can include a computing device connected to a server from a remote location. Thin clients can be components of a broader computing infrastructure, such as a network, where a plurality of thin clients shares computations with a server or server farm. Put another way, a thin client can be a network computing device without a hard disk drive acting as a terminal to the server. Example thin clients include a computing terminal at a public library or a computing terminal at an airport check-in area, among others.

Device 200 can include primary storage device 202 having an M.2 connector 206 (also referred to as a "first M.2 connector") with a first plurality of GPPs 208-1, 208-2, . . . , 208-n (referred to herein after as GPPs 208). Device 200 can also include secondary storage device 204 having an M.2 connector 210 (also referred to as a "second M.2 connector") with a second plurality of GPPs 212-1, 212-2, . . . , 212-m (referred to herein after as GPPs 212). While FIG. 2 illustrates four GPPs on each of primary storage device 202 and secondary storage device 204, examples are not so limited. GPPs 208 and 212 can be communicatively coupled to a CPU that shares functions across the first and the second plurality of GPPs. For instance, an Advanced Micro Devices V1000 may be an example of such a CPU sharing functions. As used herein, "communicatively coupled" can include coupled via various wired and/or wireless connections between devices such that data can be transferred in various directions between the devices. The coupling need not be a direct connection, and in some examples can be an indirect connection.

Primary storage device 202 and secondary storage device 204 can be communicatively coupled to controller 280. Controller 280 can be akin to controller 180 in FIG. 1 and can include a processing resource 282, a memory resource 284, and engines 286, 288, 290 according to an example. Processing resource 282, a memory resource 284, and engines 286, 288, 290 can be akin to processing resource 182, a memory resource 184, and engines 186, 188, 190 as described with respect to FIG. 1. Memory resource 284 can be in communication with the processing resource 282 via a communication link (e.g., path) 285, which can be akin to communication link 185 as described with respect to FIG. 1.

Device type engine 286 can determine a device type communicatively coupled to the primary storage device and a device type communicatively coupled to the secondary storage device. For instance, based on a PEDET signal strength, a determination can be made whether a SATA device type or an NVMe device type is communicatively coupled to each storage device In response to a SATA device type determination, SATA engine 288 can route a first SATA signal set to the primary storage device and a second SATA signal set to the secondary storage device using a crossbar switch. For instance, a CPU can have SATA signals on general purpose pins of an M.2 socket that share SATA and PCIe signals. Muxes can be set up to point one SATA signal (e.g., a transmit differential pair and a receive differential pair) to a first M.2 socket and another SATA signal set to a second M.2 socket.

In response to an NVMe device type determination, NVMe engine 290 can route an NVMe signal set to the primary storage device using a mux and the crossbar switch. For example, in response to an ×2 NVMe device type determination, a different NVMe signal set can be routed to the secondary storage device using the mux and the crossbar switch. In response to an ×4 NVMe device type determination, a third SATA signal set can be routed to the secondary storage device using the mux and the crossbar switch. In some examples, the CPU may not have a third SATA signal set, such that signals are not routed to the secondary storage device it is not possible to route signals to the other socket once a first M.2 socket is configured as ×4 NVMe.

In some examples, with two M.2 sockets set up for ×2 NVMe or SATA, a ×2 NVMe device type can be in one M.2 socket (e.g., a secondary storage device M.2 socket) and a SATA device type can be in another M.2 socket (e.g., a primary storage device M.2 socket).

Figure 3:
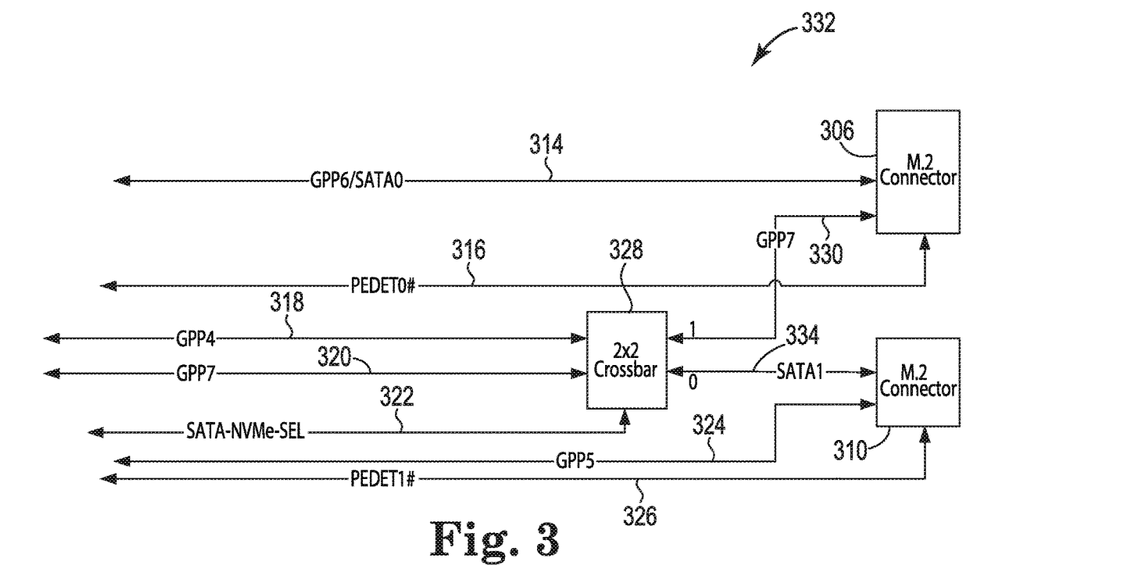
FIG. 3 illustrates a diagram of general purpose PCIe (GPP) lane options according to an example.

FIG. 3 illustrates a diagram 332 of GPP lane options according to an example. FIG. 3 includes an example of a first M.2 socket 306 and a second M.2 socket 310 that can accommodate ×2 NVMe devices allowing for two SATA devices or two ×2 NVMe devices. GPP4 318, GPP5 324, GPP6 314, and GPP7 320 represent general purpose PCIe lanes. M.2 connector 306 and M.2 connector 310 can receive PEDET signal 316 and PEDET signal 326, respectively, and use those signals to determine a device type connected to each of the M.2 connectors 306, 310. For instance, if the PEDET signal is below a particular threshold (e.g., illustrated as a "o"), it can be determined that the device is a SATA device type. Alternatively, if the PEDET signal is above a particular threshold (e.g., illustrated as a "1"), it can be determined that it is a PCIe-based device such as an NVMe device. In some instance, a PEDET signal above a particular threshold can indicate an empty socket.

Outputs of PEDET signals 316 and 326 can be routed to a CPU via a general purpose pin resulting in an output from the CPU on another general purpose pin that sets a crossbar switch 328 to point signals in a desired direction. For instance, signals along GPP4 and GPP7 may go straight through crossbar switch 328 resulting in signals along GPP7 330 going to M.2 connector 306 and a SATA signal along SATA 334 going to M.2 connector 310. Alternatively, based on PEDET signals 316 and 326, the signals could crisscross at crossbar switch 328. In some examples, if a PEDET signal is below a particular threshold, signals can cross at crossbar switch 328, and if a PEDET signal is above a particular threshold, signals can pass through crossbar switch 328 without crossing. In such an example, GPP6 ends up at M.2 connector 306 (e.g., primary storage) and GPP7 ends up at M.2 connector 310 (e.g., secondary storage). GPP6 and GPP7 can carry SATA signals in some examples.

For instance, if an NVMe type device is communicatively coupled to M.2 connector 306, a BIOS can determine what is connected (e.g., the NVMe type device or the socket is empty). In response to a determination that the NVMe type device is present, crossbar switch 328 can be flipped, so that a particular lane GPP7 330 can be pointed to M.2 connector 306, so GPP6 314 and GPP7 330 (e.g., both PCIe lanes) to M.2 connector 306. For instance crossbar switch 328 allows GPP7 320 to crossover as illustrated at GPP7 300 and go up to M.2 connector 306, while taking GPP4 318 and sending it as SATA 334 to M.2 connector 310. This can allow for SATA 334 (e.g., GPP4 318) and GPP5 324 to go to M.2 connector 310.

In some examples, if PEDET signal 316 and PEDET signal 326 are both above a particular threshold, it can be determined that two x2 NVMe devices are present, and crossbar switch 328 can allow signals to pass through without crossing, resulting in in a x2 NVME device at M.2 connector 306 and a x2 NMVe device M.2 connector 310. If PEDET signal 316 is below a particular threshold and PEDET signal 326 is above a particular threshold, it can be determined that a SATA and a x2 NMVe device are present. Crossbar switch 328 can cross the signals such that the SATA device can be connected to M.2 connector 306 and the x2 NVMe device can be connected to M.2 connector 310.

If PEDET signal 316 is above a particular threshold and PEDET signal 326 is below a particular threshold, it can be determined that a x2 NVMe device is connected to M.2 connector 306 and a SATA device may not be allowed to connect to M.2 connector 310. In such an example, crossbar switch 328 can be set to cross signals GPP4 318 and GPP7 320. In a similar example, if PEDET signal 316 is above a particular threshold and PEDET signal 326 is below a particular threshold, it can be determined that M.2 connector 306 is empty, and a SATA device can be connected to M.2 connector 310. In such an example, crossbar switch 328 can be set to allow signals GPP4 318 and GPP7 320 to pass through without crossing.

In some examples, if PEDET signal 316 and PEDET signal 326 are both above a particular threshold, it can be determined that either both M.2 connector 306 and M.2 connector 310 are empty, both have x2 NVMe devices connected, or one is empty and one has a x2 NVMe device connected. In any of the aforementioned examples, crossbar switch 328 can be set to cross signals GPP4 318 and GPP7 320.

Figure 4:
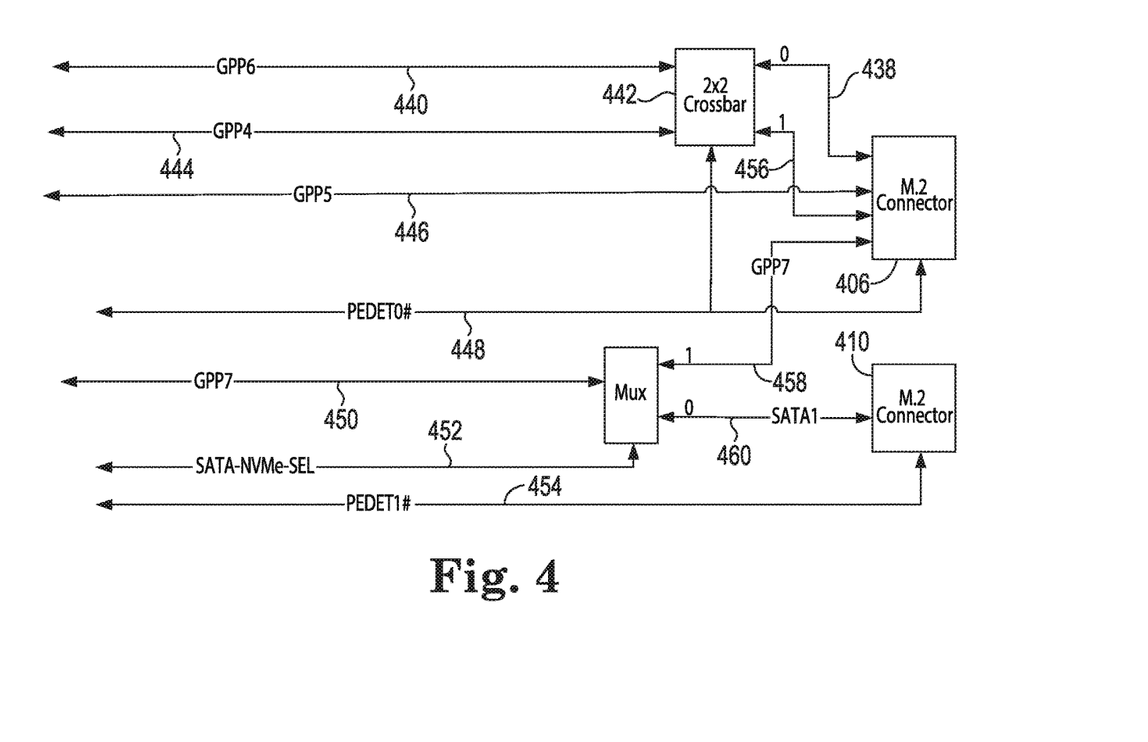
FIG. 4 illustrates another diagram of GPP lane options according to an example.

FIG. 4 illustrates another diagram 436 of GPP lane options according to an example. FIG. 4 illustrates four SATA signal sets connected to M.2 connector 406. For instance, GPP4 444, GPP5 446, GPP6 440, and GPP7 are all connected to M.2 connector 406. The example illustrated in FIG. 4 can facilitate a x4 NVMe device.

In some examples, if PEDET signal 448 and PEDET signal 454 are both below a particular threshold (e.g., illustrated as a "O"), it can be determined that a SATA type device is connected to M.2 connector 406 and/or M.2 connector 410. In such an example, the mux can be set to send a SATA signal 460 to M.2 connector 410. If PEDET signal 448 is below a particular threshold and PEDET signal 454 is above a particular threshold (e.g., illustrated as a "1"), a determination can be made that a SATA device is connected to M.2 connector 406, and an NVMe or no device is connected to M.2 connector 410. In such an example, the mux can be set to point to M.2 connector 410 (e.g., via SATA signal 460).

In an example in which PEDET signal 448 is above a particular threshold and PEDET signal 454 is below a particular threshold, it can be determined that either an NMVe device is connected to M.2 connector 406 or that M.2 connector 406 is empty. If an NVMe device type is detected, no SATA device may be allowed in M.2 connector 410, and the mux can direct SATA-NVMe-SEL signal 452 to M.2 connector 406 (e.g., at GPP7 458). If it is determined that M.2 connector 406 is empty, SATA can be allowed in M.2 connector 410, and the mux can direct SATA-NVMe-SEL signal 452 to M.2 connector 410 (e.g., at SATA signal 460).

In some examples, if PEDET signal 448 and PEDET signal 454 are both above a particular threshold, it can be determined that either both M.2 connectors 406 and 410 are empty or that M.2 connector 406 is connected to a x4 NVMe device, and M.2 connector 410 is empty. In such an example, the mux can direct SATA-NVMe-SEL signal 452 to M.2 connector 406 (e.g., at GPP7 458). In some examples, M.2 connector may be connected to an NVMe device, but only the x4 NVMe device connected to M.2 connector 406 can function.

In the example illustrated in FIG. 4, crossbar switch 442 can be used to either direct GPP6 440 and GPP4 444 straight through (e.g., via signals 438 and 456, respectively), or cross bar 442 can cross signals GPP6 440 and GPP4 444 (e.g., via signals 456 and 438, respectively). For instance, if a x4 NVMe device type is detected, GPP6 440 and GPP4 444 can be crossed at crossbar switch 442, but the signals can pass through crossbar switch 442 without crossing if a SATA type device is detected.

For instance, in the example illustrated in FIG. 4, in an x3 NVMe configuration as illustrated, two STAT devices or one x4 NVME device can be communicatively coupled to M.2 connector 406. If a SATA device type is detected, GPP6 440 can be routed to M.2 connector 406 and GPP7 450 can be routed to M.2 connector 410. A CPU can deliver SATA on via general purpose pins connected to GPP6 440 and GPP7 450. If an NVMe device type is detected at M.2 connector 406, GPP 4 444, GPP 5 446, GPP6 440, and GPP 7 450 can be delivered via the mux and crossbar switch 442 to M.2 connector 406, and the CPU can be set up to use an NVMe controller for a system having one ×4 NVMe M.2 socket 406.

Figure 5:
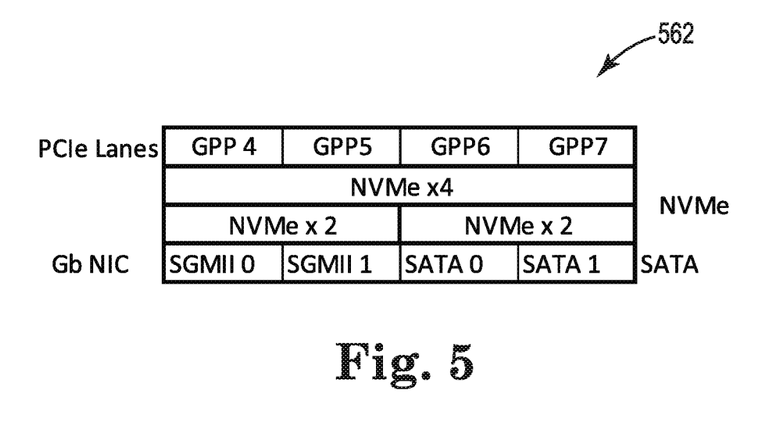
FIG. 5 illustrates a diagram of general purpose pin sharing according to an example.

FIG. 5 illustrates a diagram 562 of GPP sharing according to an example. For instance, FIG. 5 shows a comparison of how functions can be shared across pins of M.2 sockets. For instance, GPPs can be shared across general purpose PCIe lanes GPP4, GPP5, GPP6, and GPP7. GPP6 and GPP7 can be shared between a ×2 NVMe device and two SATA ports. GPP6 can be a PCIe lane set (e.g., transmit and receive), a SATA signal set (e.g., transmit and receive), or a PCIe lane that can be set up to use an NVMe controller. GPP6 and GPP7 can be used for a ×2 NVMe device, and GPP4 and GPP5 can be used for a different ×2 NVMe device. Alternatively, GPP4-GPP7 can be used for one ×4 NVMe device. For instance, with a ×2 NVMe device, two lanes are used for data. With a ×4 NVMe device, four lanes are used for data.

Figure 6:
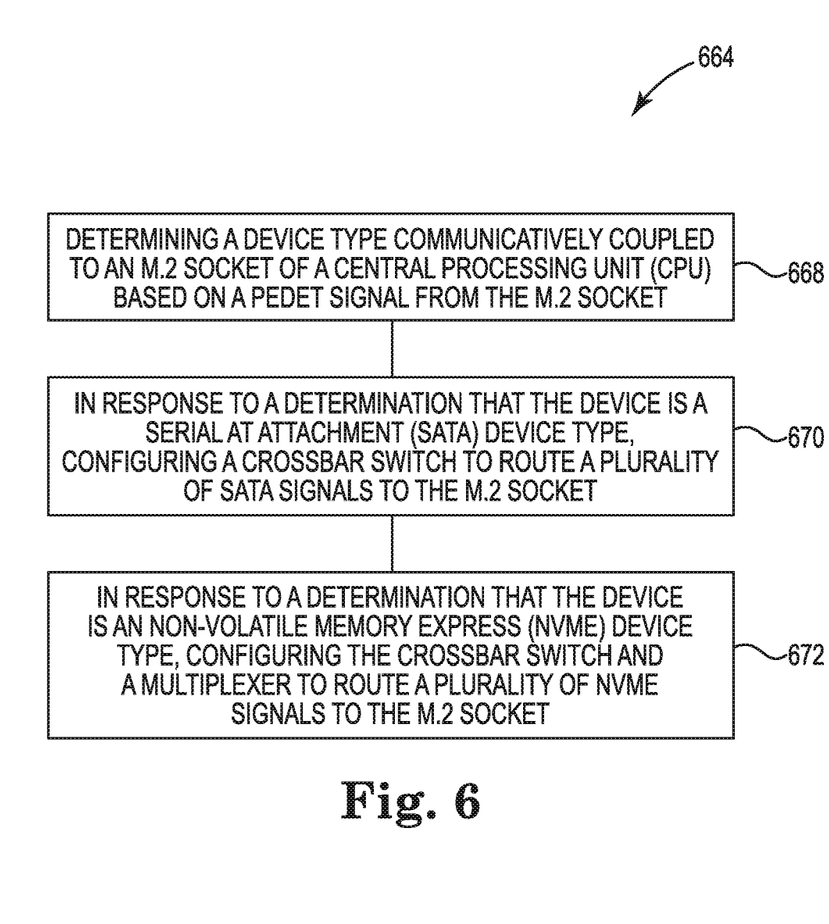
FIG. 6 illustrates a diagram of a method for a SATA and NVMe device determination according to an example.

FIG. 6 illustrates a diagram of a method for a SATA and NVMe device determination according to an example. At 668, method 664 can include determining a device type communicatively coupled to an M.2 socket of a central processing unit (CPU) based on a PEDET signal from the M.2 socket. For instance, it may be determined that the device type is the SATA device type in response to the PEDET signal falling below a threshold amount or that the device type is an ×2 NVMe device type or ×4 NVMe device type in response to the PEDET signal being above a threshold amount.

At 670, method 664 can include configuring a crossbar switch to route a plurality of SATA signals to the M.2 socket in response to a determination that the device is a SATA device type. The crossbar switch can be configured to send particular SATA signals to the M.2 socket. Configuring a crossbar switch and/or a mux can include programming and/or adjusting the crossbar switch to route signals in a particular direction.

Method 664, at 672, can include configuring the crossbar switch and a mux to route a plurality of NVMe signals to the M.2 socket in response to a determination that the device is an NVMe device type. In some examples, method 664 can include configuring the crossbar switch and the mux to route a first portion of the plurality of NVMe signals to the M.2 socket and a second portion of the plurality of NVMe signals to a different M.2 socket. In some examples, the NVMe device type can be a ×2 NVMe device type or a ×4 NVMe device type.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed is:

1. A method, comprising:
   determining a device type communicatively coupled to an M.2 socket of a central processing unit (CPU) based on a PEDET signal from the M.2 socket;
   in response to a determination that the device is a serial AT attachment (SATA) device type, configuring a crossbar switch to route a plurality of SATA signals to the M.2 socket; and
   in response to a determination that the device is a nonvolatile memory express (NVMe) device type, configuring the crossbar switch and a multiplexer to route a plurality of NVMe signals to the M.2 socket, wherein:
      in response to the PEDET signal being below a particular threshold, the plurality of SATA signals crossing each other at the crossbar switch, and the plurality of NVMe signals crossing each other at the crossbar switch; and
      in response to the PEDET signal being above a particular threshold, the plurality of SATA signals passing through the crossbar switch without crossing each other at the crossbar switch, and the plurality of NVMe signals passing through the crossbar switch without crossing each other at the crossbar switch.

2. The method of claim 1, further comprising configuring the crossbar switch and the multiplexer to route a first portion of the plurality of NVMe signals to the M.2 socket and a second portion of the plurality of NVMe signals to a different M.2 socket.

3. The method of claim 1, further comprising determining the device type is the SATA device type in response to the PEDET signal falling below a threshold amount.

4. The method of claim 1, further comprising determining the device type is an x2 NVMe device type in response to the PEDET signal being above a threshold amount.

5. The method of claim 1, further comprising determining the device type is an x4 NVMe device type in response to the PEDET signal being above a threshold amount.

6. A controller comprising a processing resource in communication with a memory resource including instructions executable to:
   determine, based on a PEDET signal and using a basic input/output system (BIOS), a device type communicatively coupled to a central processing unit (CPU) via a first M.2 socket, wherein the first M.2 socket has four general purpose pins;
   in response to a determination that the device is a serial AT attachment (SATA) device type, configure a crossbar switch to route a first SATA signal set to the first M.2 socket and a second SATA signal set to a second M.2 socket of the CPU; and
   in response to a determination that the device is a nonvolatile memory express (NVMe) device type, configure the crossbar switch and a multiplexer to route a plurality of NVMe signals to the first M.2 socket and a third signal set to the second M.2 socket, wherein:
      in response to the PEDET signal being below a particular threshold, SATA signals of the first SATA signal set, the second SATA signal set, or both, crossing each other at the crossbar switch, and the plurality of NVMe signals crossing each other at the crossbar switch; and
      in response to the PEDET signal being above a particular threshold, SATA signals of the first SATA signal set, the second SATA signal set, or both, passing through the crossbar switch without crossing each other at the crossbar switch, and the plurality of NVMe signals passing through the crossbar switch without crossing each other at the crossbar switch.

7. The controller of claim 6, wherein the third signal set comprises another plurality of NVMe signals.

8. The controller of claim 6, wherein in response to a determination that the device is a x4 NVMe device, the controller to configure the crossbar switch and the multiplexer to route the plurality of NVMe signals to the first M.2 socket and a third SATA signal set to the second M.2 socket.

9. The controller of claim 6, wherein the first SATA signal set comprises a transmit differential pair signal and a receive differential pair signal.

10. The controller of claim 6 further to route the plurality of NVMe signals via PCIe lanes.

11. A device, comprising:
a primary storage device having a first M.2 connector with a first plurality of general purpose pins,
a secondary storage device having a second M.2 connector with a second plurality general purpose pins,
wherein the first and the second plurality of general purpose pins accept serial AT attachment (SATA) signals and non-volatile memory express (NVMe) signals; and
a controller communicatively coupled to the primary storage device and the secondary storage device and comprising a processing resource in communication with a memory resource including instructions executable to:
determine a device type communicatively coupled to the primary storage device and a device type communicatively coupled to the secondary storage device based on a PEDET signal from an M.2 socket;
in response to a SATA device type determination, route a first SATA signal set to the primary storage device and a second SATA signal set to the secondary storage device using a crossbar switch; and
in response to an NVMe device type determination, route an NVMe signal set to the primary storage device using a multiplexer and the crossbar switch, wherein:
in response to the PEDET signal being below a particular threshold, the first set of SATA signals, the second of SATA signals, or both, crossing each other at the crossbar switch, and the plurality of NVMe signals crossing each other at the crossbar switch; and
in response to the PEDET signal being above a particular threshold, the first set of SATA signals, the second of SATA signals, or both, passing through the crossbar switch without crossing each other at the crossbar switch, and the plurality of NVMe signals passing through the crossbar switch without crossing each other at the crossbar switch.

12. The device of claim 11, wherein in response to an x2 NVMe device type determination, the controller to route a different NVMe signal set to the secondary storage device using the multiplexer and the crossbar switch.

13. The device of claim 11, wherein in response to an x4 NVMe device type determination, the controller to route a third SATA signal set to the secondary storage device using the multiplexer and the crossbar switch.

14. The device of claim 11, wherein the first and the second plurality of general purpose pins are communicatively coupled to a central processing unit that shares functions across the first and the second plurality of general purpose pins.

15. The device of claim 11, wherein the device is a thin client device.

* * * * *